(12) United States Patent
Frazier Fields et al.

(10) Patent No.: US 9,635,161 B1
(45) Date of Patent: Apr. 25, 2017

(54) METHODS, SYSTEMS, AND DEVICES FOR PAIRING WIRELESS COMMUNICATION DEVICES

(71) Applicant: Motorola Mobility LLC, Chicago, IL (US)

(72) Inventors: Taneka L Frazier Fields, Lilburn, GA (US); Donald L Cantrell, Chicago, IL (US); Marc B Riley, Grayson, GA (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/961,265

(22) Filed: Dec. 7, 2015

(51) Int. Cl.
*H04B 1/38* (2015.01)
*H04M 1/725* (2006.01)
*H04M 1/60* (2006.01)

(52) U.S. Cl.
CPC ..... *H04M 1/72527* (2013.01); *H04M 1/6066* (2013.01)

(58) Field of Classification Search
CPC ................ H04M 1/72527; H04M 1/6066
See application file for complete search history.

(56) References Cited

U.S. PATENT DOCUMENTS

| | | | |
|---|---|---|---|
| 6,181,956 B1* | 1/2001 | Koskan ............ | H04B 1/38 455/11.1 |
| 9,312,949 B1* | 4/2016 | Templeton ........ | H04B 7/26 |
| 2006/0094936 A1* | 5/2006 | Russ ................ | A61B 5/0205 600/300 |
| 2006/0252470 A1* | 11/2006 | Seshadri .......... | H04M 1/05 455/575.2 |
| 2008/0311966 A1* | 12/2008 | Klein ............... | H04M 1/05 455/575.2 |
| 2009/0191854 A1* | 7/2009 | Beason ............. | H04M 1/04 455/418 |
| 2012/0206129 A1* | 8/2012 | Mahan .............. | G01C 17/38 324/202 |

* cited by examiner

*Primary Examiner* — Ajit Patel
(74) *Attorney, Agent, or Firm* — Philip H. Burrus, IV

(57) ABSTRACT

A method in a wireless communication device includes detecting, with one or more control circuits actuation of the user interface actuator. The one or more control circuit can then determine whether the wireless communication device is disposed at a first predefined location, such as a first receiver of a wireless communication device accessory or a second predefined location. Where the wireless communication device is disposed at the first predefined location, the one or more control circuits can cause a wireless communication circuit to enter a first mode of operation, which can be a searching pairing mode of operation. Where the wireless communication device is disposed at the second predefined location, the one or more control circuits can cause the wireless communication circuit to enter a second mode of operation, which can be a listening pairing mode of operation.

20 Claims, 10 Drawing Sheets

METHODS, SYSTEMS, AND DEVICES FOR PAIRING WIRELESS COMMUNICATION DEVICES

BACKGROUND

Technical Field

This disclosure relates generally to electronic devices, and more particularly to wireless communication devices.

Background Art

The use of wireless electronic communication devices is becoming a ubiquitous part of life. Users of such devices rely upon them not only for communication, but also to maintain to-do lists, surf the Internet, maintain personal and business calendars, view videos, listen to audio recordings, and to stay up-to-date with friends, family, and co-workers. Such devices are used so readily, in large part, due to their portability. Portable energy sources like rechargeable batteries eliminate the need to be continually slip the surly bonds of being tethered to a power outlet, thereby allowing users to take devices with them wherever they may go.

Many wireless communication devices are equipped with interface circuitry for connection to various accessory devices. Illustrating by example, a smartphone may include an audio connector so that a headset and microphone can be attached. Alternatively, the smartphone may include a local area wireless communication circuit, such as a Bluetooth™ circuit, that wirelessly couples to an ear bud. Such interfaces are generally at least somewhat standardized so that a generic accessory, such as wireless ear buds, can work with a variety of devices.

Some accessory devices are quite small. For example, wireless headsets are commonly used with many portable electronic devices. The most compact headsets are manufactured as "in the ear" or "in the ear canal" ear buds. Ear buds generally include small speakers and fit into either the folds of the human ear or into the ear canal itself. It can be advantageous for ear buds to be as small as possible. Fashion conscious users may be reluctant to use a large earpiece that resembles a vintage hearing aid.

This desire to make ear buds smaller makes the design of such ear buds challenging. For example, there is very little room for a user interface along the housing of an ear bud device. In contrast to smart phones or other devices that can provide an infinite number of user interfaces, buttons, and controls on large touch screens, an ear bud may have only a single button. At the same time, it can be desirable to perform a variety of operations with the ear bud, including charging operations, volume control, pairing, and so forth. It would be advantageous to have improved wireless communication devices with limited user interfaces that are capable of performing sophisticated functions like pairing.

Figure 1:
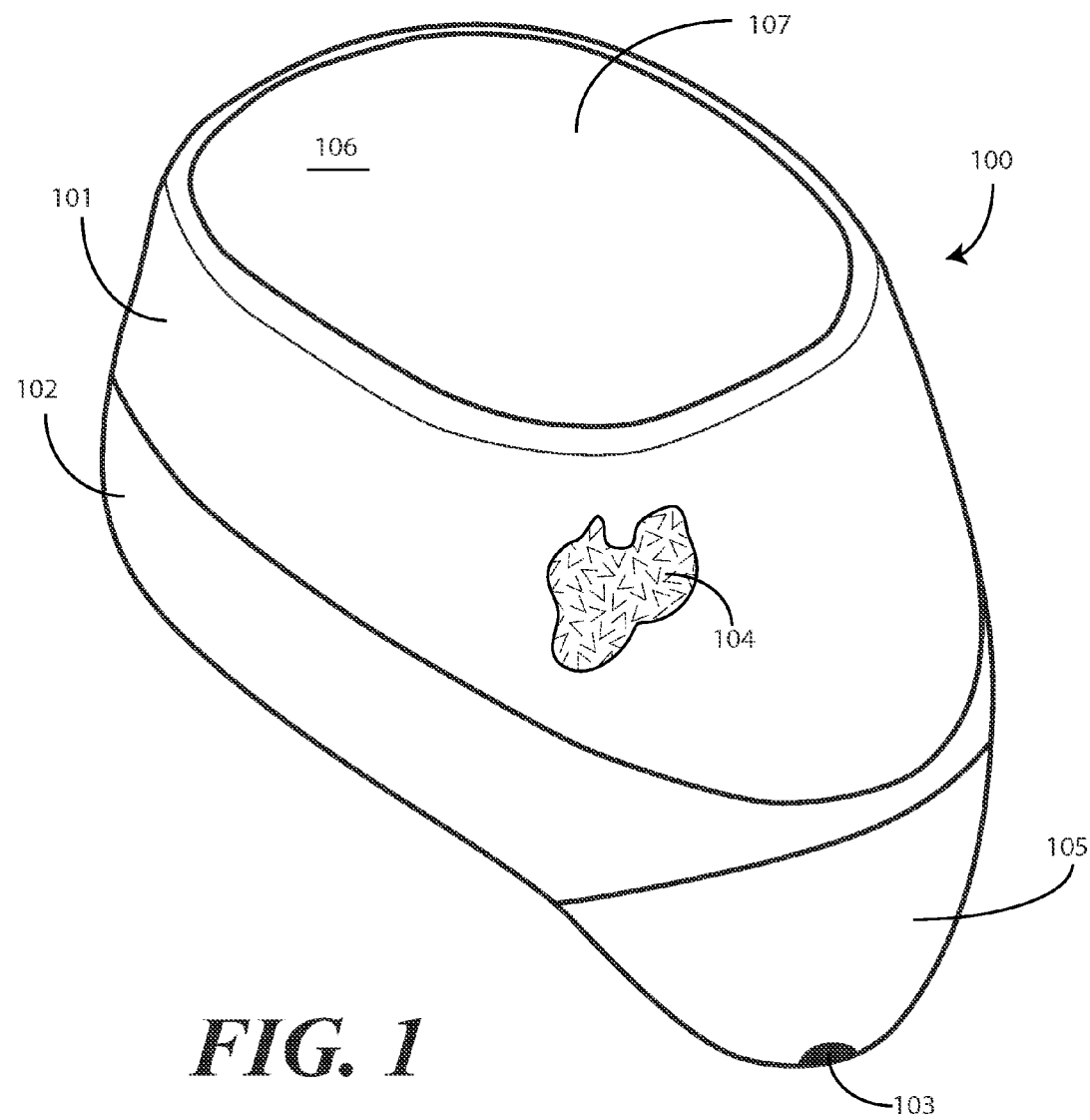
FIG. 1 illustrates one explanatory wireless communication device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to pairing wireless communication devices. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of pairing wireless communication devices as described herein. The non-processor circuits may include, but are not limited to, a radio receiver, a radio transmitter, signal drivers, clock circuits, power source circuits, and user input devices. As such, these functions may be interpreted as steps of a method to perform the pairing operations of wireless communication devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. The term "substantially" is used to refer to an orientation inclusive of manufacturing tolerances. Accordingly, where the manufacturing tolerances are plus or minus one degree, "substantially orthogonal" means between 89 and 91 degrees. Reference designators shown herein in parenthesis indicate components shown in a figure other than the one in discussion. For example, talking about a device (10) while discussing figure A would refer to an element, 10, shown in figure other than figure A.

Embodiments of the disclosure provide a method of pairing one or more wireless communication devices together. Advantageously, embodiments of the disclosure can be used with wireless communication devices having very small user interfaces, including those having a user interface with only one button. For example, in one embodiment the wireless communication device comprises an ear bud having a user interface that includes only a single button and single light emitting diode. Advantageously, using embodiments of the disclosure, this minimal user interface can be used to control many complex operations, including powering the devices OFF and ON, playing and pausing audio, and pairing one wireless communication device to another. Other operations suitable for embodiments of the disclosure will be obvious to those of ordinary skill in the art having the benefit of this disclosure.

It should be noted that for ease of discussion, an ear bud accessory device will be used as an explanatory wireless communication device. Embodiments of the disclosure are well suited for use with ear buds because these devices, as noted above, generally have very limited user interfaces. However, embodiments of the disclosure are applicable to any number of other wireless communication devices, especially those having limited user interfaces. Accordingly, while an ear bud is an explanatory wireless communication device, embodiments of the disclosure are not limited in applicability only to ear buds. Numerous other applications for embodiments of the disclosure will be obvious to those of ordinary skill in the art having the benefit of this disclosure.

Embodiments of the disclosure contemplate that, when pairing two wireless communication devices together, one wireless communication device must operate in a listening pairing mode while the other operates in a searching pairing mode. Prior art wireless communication devices default to a listening pairing mode of operation. When one is pairing a device with a sophisticated user interface, like a smartphone, to an ear bud, this default operation is fine because the ear bud can default to the listening pairing mode of operation while a user navigates a detailed instruction guide on a touch screen to cause the smartphone to enter the searching pairing mode of operation. However, when attempting to pair to ear buds together, the task is not so simple. As noted above, some ear buds only have a single button. Consequently, it is not possible to provide the detailed instruction guide on a touch screen to cause one ear bud to enter the searching pairing mode of operation.

Advantageously, embodiments of the disclosure cause a wireless communication device, like an ear bud, to enter the searching pairing mode of operation with a simple button press. When pairing one ear bud to another ear bud, a user invokes the pairing process with a simple button press on each ear bud. (Where the ear buds are configured with other user interfaces, such as voice command user interfaces, a voice command can be substituted for the button press, as will be obvious to those of ordinary skill in the art. In one or more embodiments, this simple user interface interaction causes one ear bud to enter the searching pairing mode of operation, while the other ear bud enters the listening pairing mode of operation.

Once both devices are in the appropriate pairing mode of operation, the device in the searching pairing mode of operation can then determine to which electronic device within a wireless communication range it should pair. (Embodiments of the disclosure contemplate that multiple devices may be within the wireless communication range and operating in the listening pairing mode of operation since that is the default pairing mode of prior art wireless communication devices.) Accordingly, the device operating in the searching pairing mode of operation may execute filtering operations that filter available listening devices based on one or more factors such as signal strength, device name, and/or class of device.

Once the filtering is complete, the device operating in the searching pairing mode of operation can pair to the device operating in the listening pairing mode of operation. In one embodiment, this pairing operation includes pairing to a device operating in the listening pairing mode of operation that has the strongest signal strength, as this implies that the listening device is in closest proximity to the device operating in the searching pairing mode of operation. In other embodiments, the pairing selection is based upon a combination of factors. For example, the pairing operation can include pairing to a device operating in the listening pairing mode of operation that has the strongest signal strength, has the correct device name, and that communicates with a protocol that supports the appropriate class of device. Once the pairing process is complete, both devices can provide a status to the user of success. In one embodiment, this is performed by delivering a luminous output. In another embodiment, this is performed by delivering an audio output. Other techniques for providing status will be obvious to those of ordinary skill in the art having the benefit of this disclosure.

In one embodiment, a method of pairing a wireless communication devices includes detecting, with one or more control circuits operable with a user interface actuator, actuation of the user interface actuator. In one embodiment, the method comprises detecting the actuation of the user interface actuator for at least a predetermined duration, such as two, four, five, six, or ten seconds. For example, where the user interface actuator is a push button, the one or more processors might detect that a user has pressed the push button for a predefined period of time such as six seconds.

In one embodiment, once this occurs the one or more control circuits determine whether the wireless communication device is disposed at a predefined location. For example, in one embodiment the wireless communication devices are operable with a wireless communication device accessory that is configured as wireless ear bud charger. The wireless ear bud charger can comprise a first pocket to receive a first wireless ear bud and a second pocket to receive a second wireless ear bud. In one pocket, there can be disposed the reflective surface to reflect infrared signals emitted by an optical communication node disposed in an ear bud. Where the optical communication node receives reflected signals, this is indicative of being disposed in a predefined location, which in this example is a predefined pocket of the charger.

In one embodiment, where the wireless communication device is disposed at the first predefined location, i.e., the first pocket, the one or more control circuits cause the wireless communication circuit to enter a first mode of operation. In one embodiment, this first mode of operation is the searching pairing mode of operation. Alternatively, where the wireless communication device is disposed at the second predefined location, e.g., the second pocket, the one or more control circuits can cause the wireless communication circuit to enter a second mode of operation. In one embodiment, the second mode of operation is the listening pairing mode of operation.

Turning now to FIG. 1, illustrated therein is one example of a wireless communication device 100 configured in accordance with one or more embodiments of the disclosure. As noted above, for ease of discussion the wireless communication device 100 will be shown illustratively as a wireless ear bud. However, embodiments of the disclosure are applicable to any number of other wireless communication devices, especially those having limited user interfaces. Accordingly, numerous other applications for embodiments of the disclosure will be obvious to those of ordinary skill in the art having the benefit of this disclosure.

The illustrative wireless communication device 100 of FIG. 1 includes an upper housing 101 attached to a lower housing 102. A circuit assembly is disposed within the wireless communication device 100, as well as a rechargeable battery, an acoustic driver, and other components.

In one or more embodiments, either the upper housing 101 or the lower housing 102 can define a microphone port to direct acoustic energy to one or more microphones of the circuit assembly. For example, such microphone ports can be disposed along the housing members to define acoustic beams along which acoustic energy is received. When the wireless communication device 100 is positioned in a user's ear, an acoustic beam can be directed toward the user's mouth so that the wireless communication device 100 can be used as a two-way communication device.

In the illustrative embodiment of FIG. 1, the lower housing 102 defines an acoustic driver port 103. An acoustic driver can be positioned within the acoustic driver port 103. When the wireless communication device 100 is positioned within the user's ear, the acoustic driver can deliver acoustic energy through the acoustic driver port 103 to the user's eardrum.

In one or more embodiments, the housing members are surrounded, or at least partially surrounded, by a soft, outer rubber layer 104. The soft, outer rubber layer 104, while optional, aids in user comfort by providing a soft surface against the contours of the user's ear. A cushion element 105 can be attached to the lower housing 102 to provide an acoustic seal between a user's ear canal and the lower housing 102. The cushion element 105 can be be manufactured in varying sizes so that the wireless communication device 100 can be used in different sized ears.

In this illustrative embodiment, the upper surface 106 of the wireless communication device 100 defines a user interface actuator 107 disposed along the upper housing 101. As used herein, a "user interface actuator" is a user interface element that can be actuated by a user to cause one or more control circuits of the wireless communication device 100 to perform an action. Examples of user interface actuators include push buttons, slider switches, touch pads, rocker switches, or other devices. Other examples of user interface actuators include user actuation targets presented as virtual keys on a touch sensitive display. Still others can comprise voice commands delivered to a voice control interface.

In the illustrative embodiment of FIG. 1, the user interface actuator 107 is defined by a capacitive touchpad formed by a flexible circuit substrate being placed beneath the upper surface 106 of the upper housing 101. The flexible circuit substrate, defined in more detail below with reference to FIG. 2, includes a plurality of electrical conductors that define one or more electric field lines. When a user places a finger along the upper surface 106 of the upper housing, these electrical field lines change, thereby actuating the user interface actuator 107.

Figure 2:
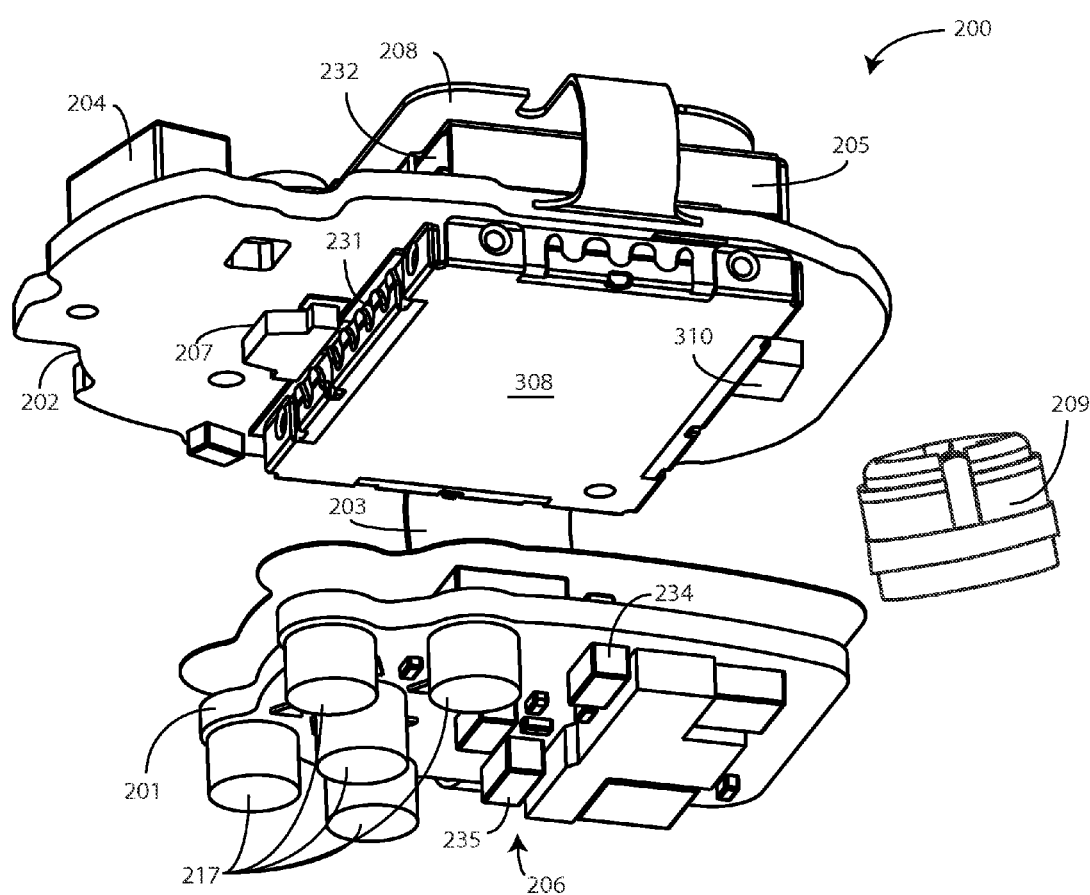
FIG. 2 illustrates explanatory electronic circuit components for a wireless communication device in accordance with one or more embodiments of the disclosure.

Turning now to FIG. 2, illustrated therein is a circuit assembly 200 suitable for use in the wireless communication device (100) of FIG. 1. The circuit assembly 200 of FIG. 2 is only an explanatory circuit assembly used to illustrate examples of location detecting and communication components suitable for use with embodiments of the disclosure. Those of ordinary skill in the art having the benefit of this disclosure will readily understand that circuit assemblies can be configured in any number of ways. Moreover, location detecting and other components can be substituted. For example, while an optical communication node will be used as one explanatory location detector, others such as Hall effect sensors, wireless communication deices, radio frequency identification devices, surface acoustic wave devices, or electrical terminals can be substituted for the optical communication node to perform substantially the same function.

This illustrative circuit assembly 200 includes a first circuit board 201 and a second circuit board 202. In one embodiment, each of the first circuit board 201 and the second circuit board 202 is manufactured from multiple layers. Some layers can be selectively placed conductive metal, such as copper or aluminum, while other layers can be insulative. Insulative layers can be manufactured from fiberglass, FR4, or other materials. In one or more embodiments, each of the first circuit board 201 and the second circuit board 202 comprises a fiberglass printed circuit board. In another embodiment, each of the first circuit board 201 and the second circuit board 202 is a FR4 printed circuit board.

In this illustrative embodiment, a first flexible substrate 203 is interposed between, and is continuous with, the first circuit board 201 and the second circuit board 202. The first flexible substrate 203 can be manufactured as a continuous component of the circuit assembly 200 in a variety of ways. Illustrating by example, in one embodiment the first circuit board 201 and the second circuit board 202 can be manufactured as a single, contiguous, unitary circuit board. The conductive and insulative layers of the single, contiguous, unitary circuit board can then be selectively removed along the first flexible substrate 203 until only a single layer of conductive metal from one of the internal layers remains. Insulative material, such as insulative tape, can then be placed about the single layer of conductive metal to form the first flexible substrate 203.

Making the first flexible substrate 203 continuous with the first circuit board 201 and the second circuit board 202 eliminates the need for connectors to be disposed along each of the first circuit board 201 and the second circuit board 202 for connection to an intermediate flexible substrate. This results in more surface area along each of the first circuit board 201 and the second circuit board 202 for electronic components. This elimination of the need for connectors also reduces the overall "stack-up" height of the circuit assembly 200. The inclusion of the first flexible substrate 203 as a continuous element between the first circuit board 201 and the second circuit board 202 also advantageously allows the circuit assembly 200 to fold or otherwise be wrapped around components. For example, the first circuit board 201, the second circuit board 202, and the first flexible substrate 203 can be wrapped about a rechargeable battery.

In this illustrative embodiment, the circuit assembly 200 also includes a second flexible substrate 208. In one embodiment, as was the case with the first flexible substrate 203, the second flexible substrate 208 is continuous with a printed circuit board in that the second flexible substrate 208 extends from, and is continuous with, the second circuit board 202. In the illustrative embodiment of FIG. 2, the second flexible substrate 208 is folded back over the second circuit board 202. Advantageously, in one or more embodiments the second flexible substrate 208 can be used as a touch sensor beneath the upper surface (106) of the upper housing (101) of a wireless communication device (100) when the wireless communication device (100) is disposed within a user's ear.

By placing the second flexible substrate 208 just beneath the upper surface (106) of the upper housing (101) of the wireless communication device (100), in one embodiment a user interface actuator (107) in the form of a touch sensitive surface may be created along the upper surface (106). The user can then control the device by interfacing with the touch sensitive surface, thereby eliminating the need for buttons or other controls that, when actuated, may move the wireless communication device (100) within the user's ear.

The second flexible substrate 208 can define a touch sensor in one of a variety of ways. In one or more embodiments, the second flexible substrate 208 defines a capacitive touch-sensing user interface actuator. The capacitive touch-sensitive user interface actuator can be configured to detect movement of, for example, a user's finger, occurring within a region defined by, for example, the outer perimeter of the second flexible substrate 208. In one embodiment, the second flexible substrate 208 can comprise a first conductor or a first plurality of conductors and a second conductor or second plurality of conductors. These conductors can then cross over each other to define a grid of pixels (where only two conductors are used the second flexible substrate 208 will define a single, large pixel forming a grid of one pixel). One conductor or set of conductors can be coupled to a touch driver, operable with a control circuit, which delivers a signal to each pixel of the grid. Electrical charges then travel to the pixel(s) of the grid. Electromagnetic fields are then created about the pixel(s). The fields are altered by interaction of a user's finger or other conductive object interacting with the second flexible substrate 108. This alteration allows the control circuit to detect touch input.

In one embodiment, where multiple pixels are used, the electrodes defining each pixel along the second flexible substrate 208 can define a coordinate plane. Said differently, each pixel can correspond to a different a particular geographic coordinate along the second flexible substrate 208. By detecting a change in the capacitance of one or more pixels, the control circuit can thus determine an X and Y coordinate at which the touch input occurs. This locational information can be used to control data the device, such as to deliver volume up or volume down information. Other forms of touch-sensitive surfaces disposed along the second flexible substrate 208 for use with embodiments of the disclosure will be obvious to those of ordinary skill in the art having the benefit of this disclosure.

While a capacitive touchpad is one technology suitable for use as a user interface actuator (107), those of ordinary skill in the art having the benefit of this disclosure will understand that other technologies can be used to define the user interface actuator (107) as well. As noted above, push buttons, slider switches, touch pads, rocker switches, or other devices can alternatively be used as the user interface actuator (107). Still other examples of user interface actuators include user actuation targets presented as virtual keys on a touch sensitive display or voice commands delivered to a voice control interface.

Where the second flexible substrate 208 is used to define the user interface actuator (107), capacitive technologies are but one way to detect user actuation. The second flexible substrate 208 could alternatively detect user actuation using a surface acoustic wave touch sensor, a surface capacitance sensor, a projected capacitance sensor, a mutual capacitance sensor, a self-capacitance sensor, an infrared grid sensor, an infrared acrylic projection sensor, an optical imaging sensor, a dispersive signal sensor, an acoustic pulse recognition sensor, and so forth.

A plurality of electrical components can be disposed on one or more of first circuit board 201, the second circuit board 202, or combinations thereof. In one embodiment, these electrical components can include one or more control circuits 231. The one or more control circuits 231 can include one or more processors, such as an application processor and, optionally, one or more auxiliary processors. One or both of the application processor or the auxiliary processor(s) can be a microprocessor, a group of processing components, one or more Application Specific Integrated Circuits (ASICs), programmable logic, or other type of processing device. The application processor and the auxiliary processor(s) can be operable with the various components disposed along the first circuit board 201, the second circuit board 202, or combinations thereof. For example, the one or more control circuits 231 can be operable with the acoustic driver 209, one or more microphones, the second flexible substrate 208 when configured as a capacitive touch sensor, and so forth. In one embodiment, the acoustic driver 209 comprises a balanced armature speaker. The acoustic driver 209 is a speaker in one embodiment that will serve as the acoustic output of an electronic device that delivers sound to a user's eardrum.

In one embodiment, the one or more control circuits 231 can be configured to process and execute executable software code to perform the various functions of the wireless communication device (100) into which the printed circuit board assembly is disposed. One of the electronic components can comprise a storage device, such as memory. The memory can optionally store the executable software code used by the one or more control circuits 231 during operation. The program instructions may alternatively be stored on-board the one or more control circuits 231. The memory devices may include either or both static and dynamic memory components, may be used for storing embedded code.

In this illustrative embodiment, one electrical component comprises a wireless communication circuit 232 configured for wireless communication with one or more other devices or networks. The chip antenna 204 of the wireless communication circuit 232 is shown in this embodiment, as the other wireless communication circuitry is disposed beneath electromagnetic shield 205. The networks can include a local area network and/or personal area network. The communication circuit may utilize wireless technology for communication, such as, but are not limited to, peer-to-peer or ad hoc communications such as HomeRF, Bluetooth™, and IEEE 802.11 (a, b, g or n). The wireless communication circuit 232 can include wireless communication circuitry, one of a receiver, a transmitter, or transceiver, and one or more antennas.

In one embodiment, the one or more electronic components can comprise an optical communication node 206. For example, in this embodiment, the optical communication node 206 comprises infrared transceivers 234,235. When the circuit assembly 200 is disposed in a wireless communication device (100), in one embodiment the lower housing (102) includes a window proximately located adjacent to the infrared transceivers 234,235, as will be shown in more detail with reference to FIG. 4 below. The infrared transceivers 234,235 can use a signal emitter that transmits a beam of infrared (IR) light, and then computes the distance to any nearby objects from characteristics of the returned, reflected signal. The returned signal may be detected using a signal receiver, such as an IR photodiode to detect reflected light emitting diode (LED) light, responding to modulated IR signals, and/or triangulation. When the wireless communication device (100) is placed within an ear, the infrared transceivers 234,235 can detect this placement. The one or more control circuits 231 can use this detected infrared reflection to active the remaining electrical components. Other proximity sensor components can be substituted for the infrared sensors, such as but not limited to, capacitive, magnetic, inductive, optical/photoelectric, laser, acoustic/sonic, radar-based, Doppler-based, thermal, and radiation-based proximity sensors.

In one embodiment, a rechargeable battery powers the various electronic components. Electrical contacts 217 can be included for charging the battery. In this illustrative embodiment, the electrical contacts 217 are disposed along a bottom major face of the first circuit board 201. In one or more embodiments, the electrical contacts 217 can also be used for programming the one or more electrical circuits comprising electronic components as well. For example, one or more of the electrical contacts 217 can be used to deliver firmware updates to the one or more control circuits 231 and so forth.

One or more output devices can also be attached to the circuit assembly 200 for use as indicators. For example, in this embodiment, a light emitting diode 207 is disposed along the second major face of the second circuit board 202. When the circuit assembly 200 is disposed in a wireless communication device (100), and the lower housing (102) includes a window proximately located with the light emitting diode 207, it can project light through the window to provide device status to a user.

Illustrating by example, during a pairing process the light emitting diode 207 can present a first indication before the pairing the wireless communication device (100) to another wireless communication device. The first indication might comprise a blinking luminous output that occurs when the light emitting diode 207 blinks. Additionally, the light emitting diode 207 might present a second indication after the pairing the wireless communication device (100) to another wireless communication device. One example of the second indication would be a continuous luminous output that occurs when the light emitting diode 207 is illuminated continuously for a period of time. Other indications, such as audio outputs, tactile outputs, and so forth, provided by other output devices, will be obvious to those of ordinary skill in the art having the benefit of this disclosure.

Figure 3:
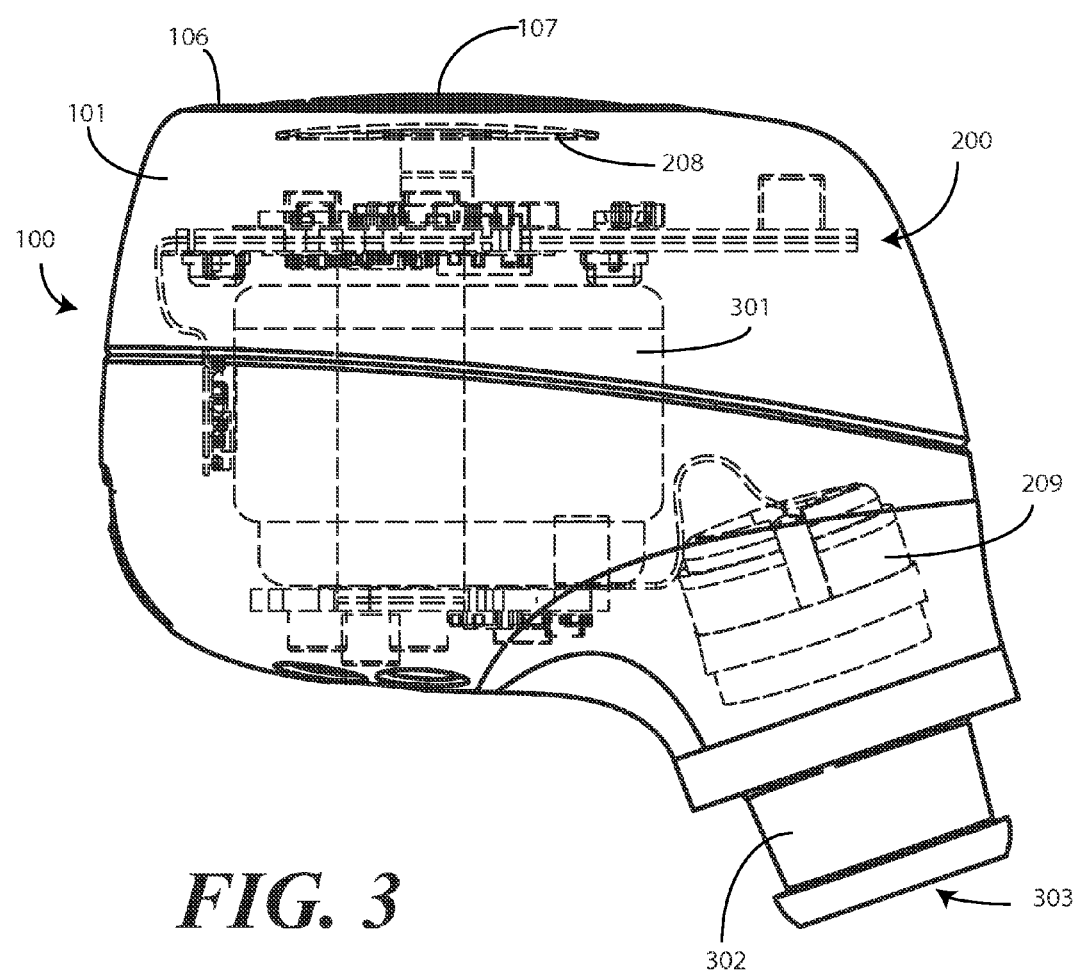
FIG. 3 illustrates another explanatory wireless communication device in accordance with one or more embodiments of the disclosure.

Turning now to FIG. 3, illustrated therein is a side view of the wireless communication device 100 with the circuit assembly 200 disposed therein. The upper housing 101 is coupled to the lower housing 102. Additionally, the cushion element (105) of FIG. 1 has been removed to reveal an ear insertion stem 302. The acoustic driver 209 is electrically coupled to the circuit assembly 200 by a pair of wire leads. The circuit assembly 200 is folded to form a "C" shape about a rechargeable battery 301. As described above, the second flexible substrate 208 of the circuit assembly 200 is folded back over the second circuit board 202 so as to be used as a user interface actuator 107 defined by a touch sensor disposed just beneath the upper surface 106 of the upper housing 101.

Figure 4:
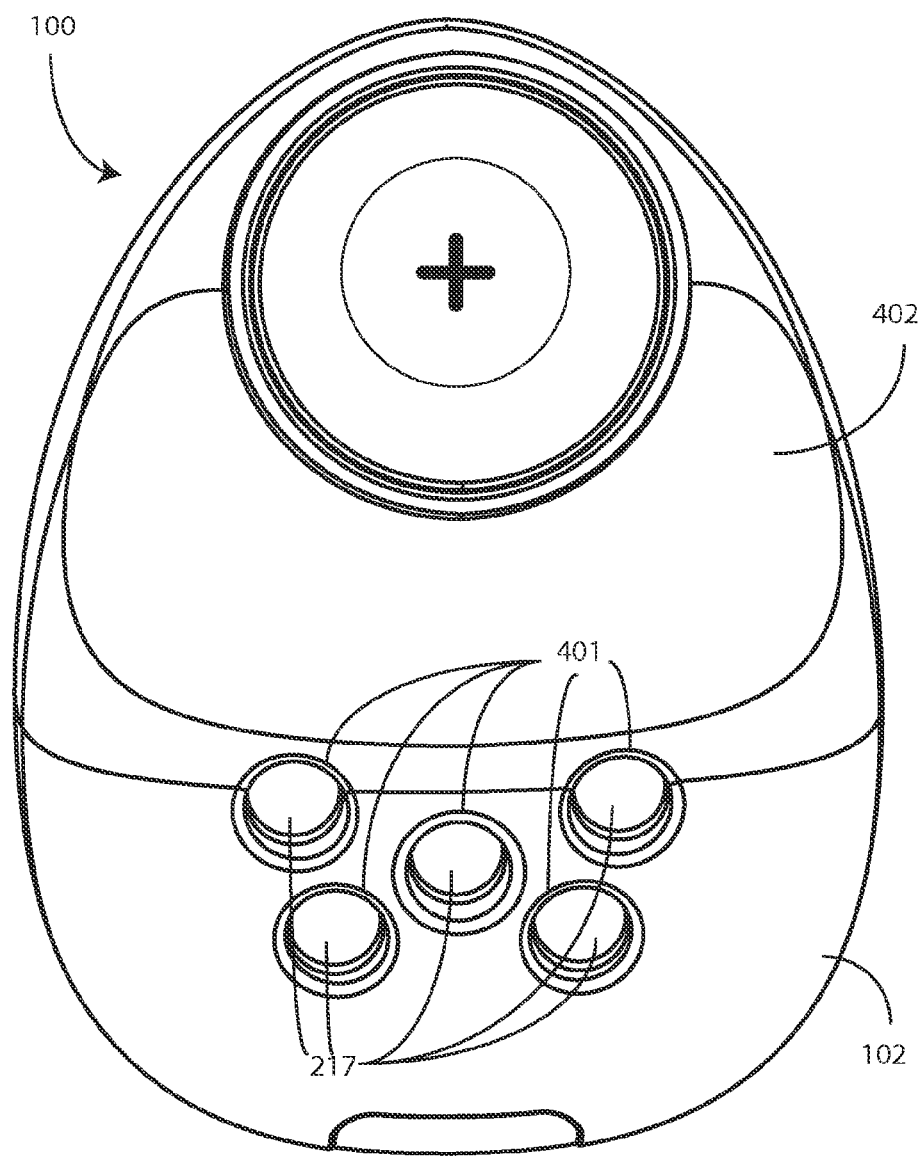
FIG. 4 illustrates an explanatory housing of a wireless communication device in accordance with one or more embodiments of the disclosure.

Turning now to FIG. 4, illustrated therein is a bottom plan view of the lower housing 102 of the wireless communication device 100. As shown in FIG. 4, the one or more electrical contacts 217 are exposed through complementary apertures 401 of the lower housing 102 to permit charging of the rechargeable battery (301) and, optionally, programming of the one or more control circuits 231 or other processors of the wireless communication device 100.

An infrared window 402 is disposed along the bottom of the lower housing 102. Recall from above that in one embodiment the one or more electronic components of the circuit assembly (200) can include an optical communication node (206) defined by one or more infrared transceivers (234,235). When the circuit assembly (200) is disposed in the lower housing 102, the infrared window 402 is proximately located with the infrared transceivers (234,235). Accordingly, the infrared transceivers (234,235) can use a signal emitter that transmits a beam of infrared (IR) light through the infrared window 402 to, for example, compute the distance to any nearby objects from characteristics of the returned, reflected signal. The one or more control circuits (231) can then determine that the wireless communication device 100 is disposed in a user's ear when the returned, reflected signal saturates. Alternatively, as will be described below, the one or more control circuits (231) can cause the wireless communication circuit (232) to enter a searching pairing mode of operation when the wireless communication device 100 is disposed within a wireless communication device accessory. In one embodiment, the infrared window 402 is part of the lower housing 102. In one embodiment the infrared window 402 is manufactured from a clear material, such as a clear thermoplastic.

Figure 5:
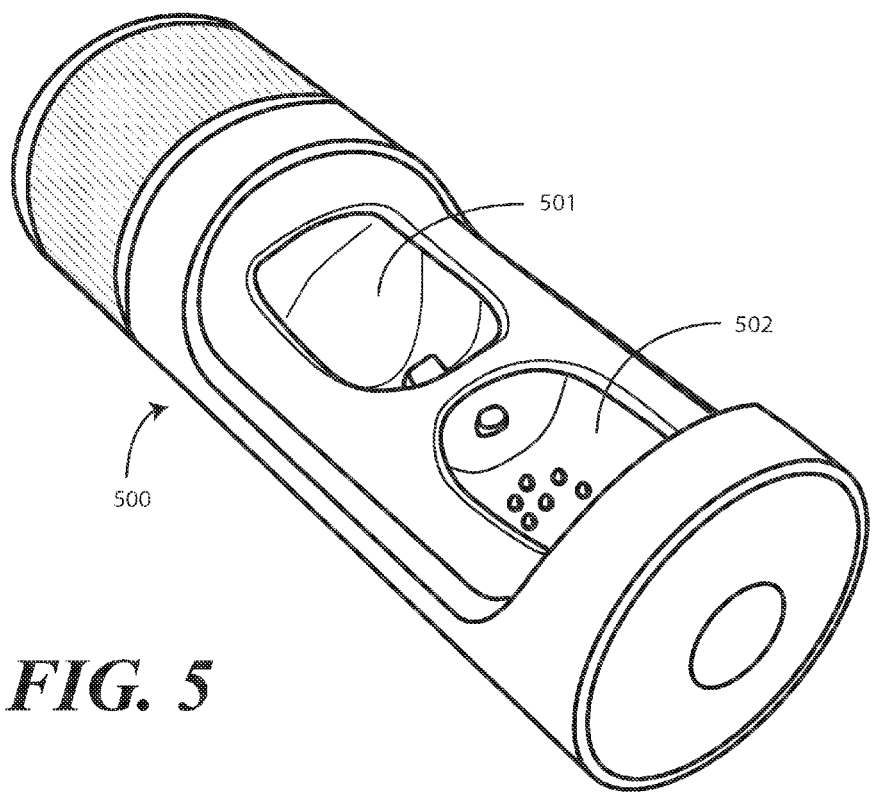
FIG. 5 illustrates a perspective view of one explanatory wireless communication device accessory in accordance with one or more embodiment of the disclosure.

Turning now to FIG. 5, illustrated therein is one explanatory wireless communication device accessory 500 in accordance with one or more embodiments of the disclosure. The explanatory wireless communication device accessory 500 of FIG. 5 is shown as a charger for the wireless communication device (100) of FIGS. 1, 3, and 4. However, the wireless communication device accessory 500 could take other forms as well. For example, the wireless communication device accessory 500 may comprise a case for the wireless communication device (100), a docking station, or other form. Still other examples of wireless communication device accessories will be obvious to those of ordinary skill in the art having the benefit of this disclosure.

In the illustrative embodiment of FIG. 5, the wireless communication device accessory 500 comprises a first receiver 501 to receive a first wireless communication device and a second receiver 502 to receive a second wireless communication device. In this illustrative embodiment, the first receiver 501 comprises a first pocket to receive a first wireless ear bud, while the second receiver 502 comprises a second pocket to receive a second wireless ear bud.

Figure 6:
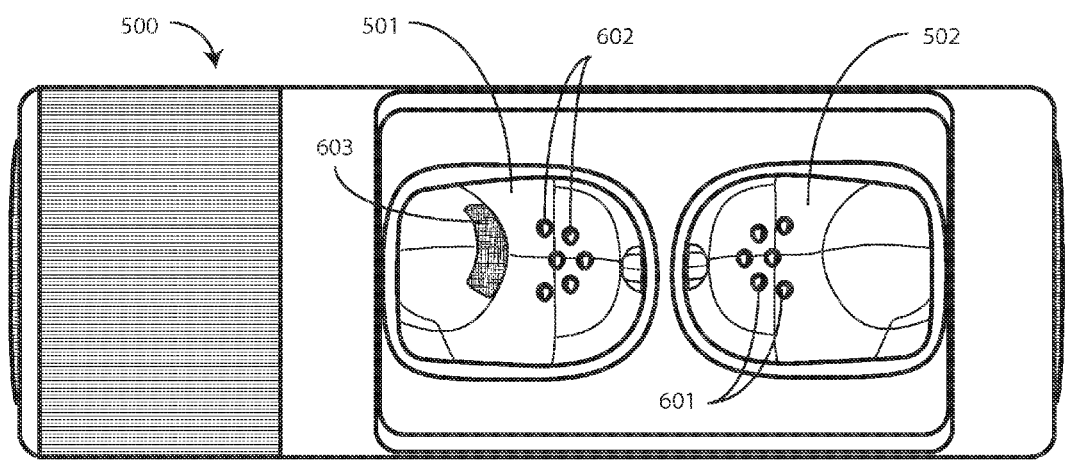
FIG. 6 illustrates a top plan view of one explanatory wireless communication device accessory in accordance with one or more embodiment of the disclosure.

Turning to FIG. 6, the first receiver 501 and the second receiver 502 are shown in plan view. Since the wireless communication device accessory 500 is a charger, in one embodiment each of the first receiver 501 and the second receiver comprises electrical contacts 601,602 to couple to the one or more electrical contacts (217) of a wireless ear bud that are exposed through complementary apertures (401) of a lower housing (102). In one embodiment, the electrical contacts 601,602 deliver current to the electrical contacts (217) of the wireless ear bud to permit charging of a rechargeable battery (301). The electrical contacts 601,602 can optionally deliver data to program one or more control circuits (231) or other processors of an ear bud as previously described.

In one embodiment, one of the first receiver 501 or the second receiver 502 includes a definition device to indicate to a wireless communication device (100) inserted into the receiver that it is a special type of receiver. The definition device can take various different forms. In the illustrative embodiment of FIG. 5, the definition device comprises a reflective surface 603. Recall from above that in one embodiment an infrared window (402) is disposed along the bottom of a lower housing (102) of a wireless communication device (100). Infrared transceivers (234,235) can use a signal emitter that transmits a beam of infrared (IR) light through the infrared window (402). In one embodiment, the reflective surface 603 is to reflect these optical communication signals back to optical communication node (206) of a wireless communication device (100) when the wireless communication device (100) is disposed within the first receiver 501. This allows the optical communication node (206) to function as a location detector to determine whether the wireless communication device (100) is disposed at a predefined location. Where the reflective signals are received, the one or more control circuits (231) can conclude that the wireless communication device (100) is disposed at a predefined location. By contrast, when no reflected signals are received, the one or more control circuits (231) can conclude that the wireless communication device (100) is not disposed at the predefined location.

When used in conjunction with actuation of a user interface actuator (107), these reflections can indicate that the one or more control circuits (231) should change a mode of operation. For example, the reflective surface 603 can reflect infrared signals emitted by the optical communication node (206) of a wireless communication device to cause the one or more control circuits (231) to cause the wireless communication circuit (232) to enter a searching pairing mode of operation.

While a reflective surface 603, operable with an optical communication node (206), is one example of an identification device, embodiments of the disclosure are not so limited. Other identification devices that allow the one or more control circuits (231) of a wireless communication device (100) to determine whether it is in a predefined location can include Hall effect sensors, wireless communication deices, radio frequency identification devices, surface acoustic wave devices, or electrical terminals. Still others will be obvious to those of ordinary skill in the art having the benefit of this disclosure.

Figure 7:
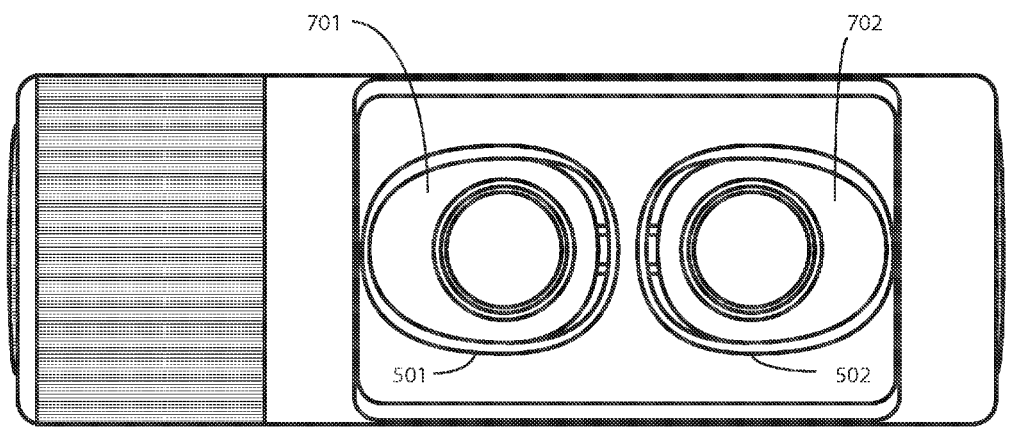
FIG. 7 illustrates two explanatory wireless communication devices disposed in receivers of one explanatory wireless communication device accessory in accordance with one or more embodiment of the disclosure.
Figure 8:
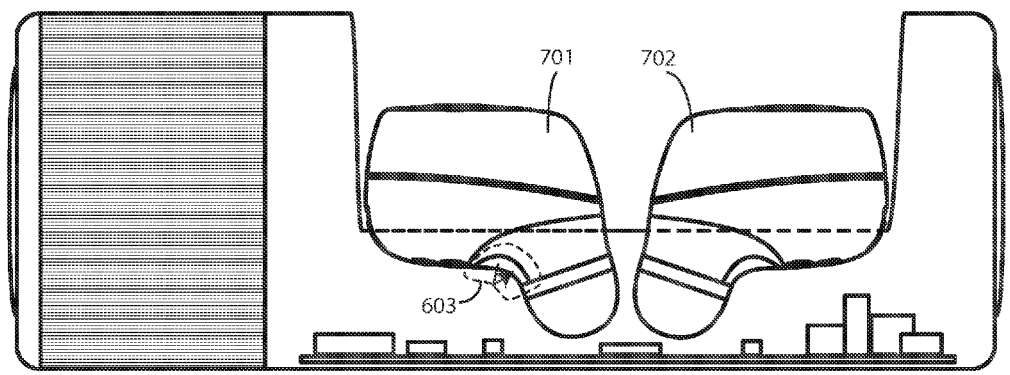
FIG. 8 illustrates a sectional view of two explanatory wireless communication devices disposed in receivers of one explanatory wireless communication device accessory in accordance with one or more embodiment of the disclosure.

Turning to FIG. 7, a first wireless communication device 701 and a second wireless communication device 702 have been disposed within the first receiver 501 and the second receiver 502, respectively. In this illustrative embodiment, each wireless communication device is configured as was wireless communication device (100) of FIGS. 1, 3, and 4 above. As shown in FIG. 8, the first wireless communication device 701 is in the pocket with the reflective surface 603, while the second wireless communication device 702 is in a pocket with no reflective surface. Accordingly, when the infrared signal emitters of the optical communication node (206) emit infrared signals, these signals will be reflected from the reflective surface 603 to the infrared receivers of the optical communication node (206), thereby causing the infrared receivers to saturate. In one or more embodiments, this reflection will be used to adjust the mode of operation in accordance with the methods described below with reference to FIGS. 9-12.

Figure 9:
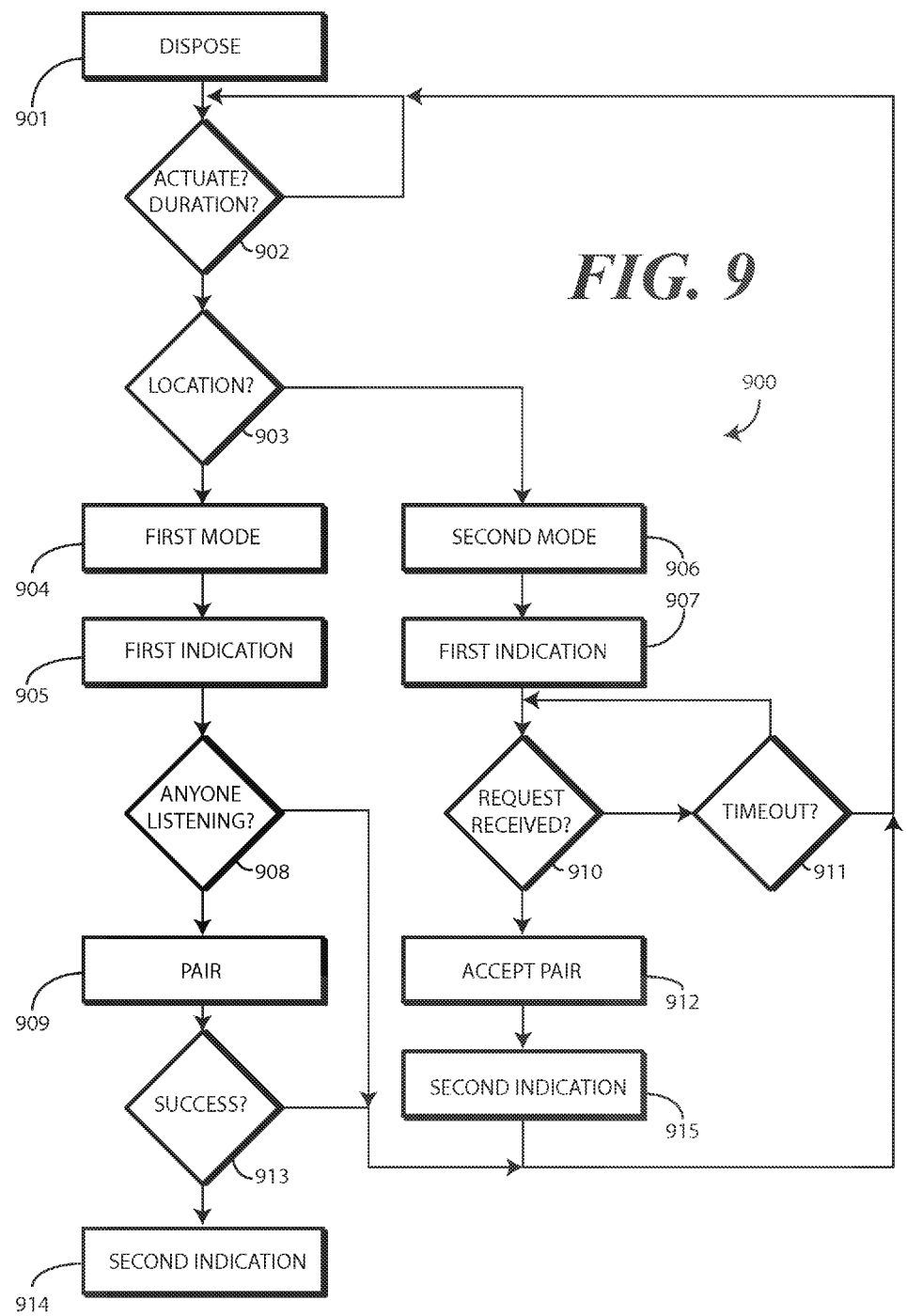
FIG. 9 illustrates one explanatory method in accordance with one or more embodiments of the disclosure.

Turning to FIG. 9, illustrated therein is a method 900 for a wireless communication device (100) that enables pairing to another wireless communication device with a simple actuation of a user interface actuator (107). The method 900 generally includes the following steps: detecting, with one or more control circuits (231) operable with a user interface actuator (107), actuation of the user interface actuator for at least a predetermined duration; and determining, with the one or more control circuits, whether the wireless communication device is disposed at a first predefined location or a second predefined location, e.g., the first receiver (501) or the second receiver (502) of wireless communication device accessory (500). In one embodiment this is determined by identifying whether the optical communication node (206) receives reflected signals from the reflective surface (603) of the first receiver (501). Where the wireless communication device is disposed at the first predefined location, the method 900 includes causing, with the one or more control circuits, a wireless communication circuit (232) to enter a first mode of operation. In one embodiment, the first mode of operation is a searching pairing mode of operation. Alternatively, where the wireless communication device is disposed at the second predefined location, the method 900 includes causing, with the one or more control circuits, the wireless communication circuit to enter a second mode of operation. In one embodiment the second mode of operation is a listening pairing mode of operation. While additional details are provided in the various steps of FIG. 9, these details are explanatory only. Other ways of implementing the basic steps of this paragraph will be obvious to those of ordinary skill in the art having the benefit of this disclosure.

Beginning at step 901, the method includes placing a first wireless communication device (701) and a second wireless communication device (702) within the first receiver (501) and the second receiver (502), respectively, of a wireless communication device accessory (500). Step 901 can also include actuating a user interface actuator (107). For example, where the user interface actuator (107) comprises a touch sensitive surface along an upper surface (106) of an upper housing (101), actuation could comprise a user placing a finger adjacent to the upper surface (106) of the upper housing (101).

At decision 902, the method 900 determines whether the actuation of the user interface actuator (107) at step 901 occurred for at least a predetermined duration. The predetermined duration can vary. In one embodiment, the predetermined duration is at least two seconds. In another embodiment, the predetermined duration is at least six seconds. In another embodiment, the predetermined duration is at least ten seconds. Other predetermined durations will be obvious to those of ordinary skill in the art having the benefit of this disclosure. Where, for example, the predetermined duration is six seconds, decision 902 will be affirmative when the user places a finger adjacent to the upper surface (106) of the upper housing (101) for at least six seconds.

At decision 903, the method 900 determines determining, with the one or more control circuits, whether each wireless communication device is disposed at a first predefined location or a second predefined location. For example, at decision 903 the method 900 determines whether the first wireless communication device (701) or the second wireless communication device (702) is disposed within the first receiver (501). In one embodiment, one or more control circuits (231) make this determination by identifying whether an optical communication node (206) receives reflections of signals emitted by the optical communication node. If the first wireless communication device (701) and the second wireless communication device (702) are disposed within the first receiver (501) and the second receiver (502), respectively, of a wireless communication device accessory (500), and the first receiver includes a reflective surface (603), the one or more control circuits (231) can determine whether reflections are reflected from the reflective surface (603) disposed along the first receiver (501) of the wireless communication device accessory (500).

At step 904, where the wireless communication device is disposed at the first predefined location, the method 900 includes causing, with the one or more control circuits, the wireless communication circuit (232) to enter a first mode of operation. In one embodiment, the first mode of operation comprises a searching pairing mode of operation. In one embodiment, this comprises transmitting an identification request to search for devices. Illustrating by example, if first wireless communication device (701) is disposed within the first receiver (501) of the wireless communication device accessory (500), its optical communication node (206) will receive reflections from the reflective surface (603). Accordingly, its control circuit (231) will cause the wireless communication circuit (232) to enter the searching pairing mode of operation at step 904. In one embodiment, the searching pairing mode of operation is invoked for only a limited time, such as between fifteen and thirty seconds, inclusive. The first wireless communication device (701) can thus send one or more identification requests to nearby devices.

At step 905, the method 900 can include presenting, with an output device, a first indication after causing the wireless communication circuit to enter the searching pairing mode of operation at step 904. In one embodiment, presentation of the first indication at step 905 occurs before the pairing the first wireless communication device (701) to another wireless communication device. In one embodiment, the first indication comprises a blinking luminous output. For example, the light emitting diode (207) can blink green to let the user known that a paring process has been invoked. Other indications can include sounds, haptic outputs, and so forth.

By contrast, at step 906, where the wireless communication device is disposed at the second predefined location, the method 900 include causing, with the one or more control circuits, the wireless communication circuit to enter a second mode of operation. In one embodiment, the second mode of operation comprises a listening pairing mode of operation. Illustrating by example, if second wireless communication device (702) is disposed within the second receiver (502) of the wireless communication device accessory (500), its optical communication node (206) will not receive reflections from the second receiver (502) because it contains no reflective surface (603). Accordingly, its control circuit (231) will cause the wireless communication circuit (232) to enter the listening pairing mode of operation at step 906. In one embodiment, the listening pairing mode of operation is invoked for only a limited time, such as between fifteen and thirty seconds, inclusive. At step 907, the method 900 can include presenting, with an output device, a first indication after causing the wireless communication circuit to enter the listening pairing mode of operation at step 906.

At decision 908, the wireless communication device operating in the searching pairing mode of operation determines whether any nearby wireless communication devices are operating in the listening pairing mode of operation. In one embodiment, this occurs by determining whether any responses to the identification request are received. Continuing the example from above, at decision 908 the first wireless communication device (701), being disposed within the first receiver (501) of the wireless communication device accessory (500) and receiving reflections from the reflective surface (603), operates in the searching pairing mode of operation at step 904 and sends out an identification request. Meanwhile, the second wireless communication device (702), being disposed within the second receiver (502) of the wireless communication device accessory (500) and not receiving reflections from the second receiver (502) because it contains no reflective surface (603), operates in the listening pairing mode of operation, receives the identification request, and sends an identification response. Accordingly, at decision 908 the first wireless communication device (701) will determine that the second wireless communication device (702) is present.

When this occurs, at step 909 the first wireless communication device (701) will execute the pairing process. In one embodiment, this comprises sending a pairing request. It is contemplated that there may be more than one wireless communication device operating in the listening pairing mode of operation. Accordingly, in one embodiment, decision 908 will involve receiving a plurality of identification responses. Where this occurs, the first wireless communication device (701) can perform one or more filtering operations at step 909. For example, the first wireless communication device (701) can filter wireless communication devices operating in the listening pairing mode of operation based on signal strength, device name, and class of device. In one or more embodiments, the pairing process executed at step 909 comprises sending a pairing request to the closest device found that is the proper class of device and that includes an expected device name. If, for example, both wireless communication devices are wireless ear buds, the class of device might be 0x240404. If both wireless communication devices are wireless ear buds manufactured by Motorola Mobility, the device name might be "Moto Verve" or another model name. These classes and names are illustrative only, as others will be obvious to those of ordinary skill in the art having the benefit of this disclosure.

Whether this pairing request is received by the second wireless communication device (702) is determined at decision 910. If no pairing request is received for a predetermined time, as determined at decision 911, the second wireless communication device (702) will exit the listening pairing mode of operation to prevent the receipt of pairing requests from unauthorized devices. In one embodiment, this predetermined time is about thirty seconds.

Where the second wireless communication device (702) receives the pairing request from the first wireless communication device (701), as determined at decision 910, the second wireless communication device will accept the pair request at step 912 and will send a pairing response to the first wireless communication device (701). The first wireless communication device (701) can determine whether the pairing was successful at decision 913. Where it is, one or both of the first wireless communication device (701) and the second wireless communication device (702) can present, at steps 914 and 915, respectively, with an output device such as light emitting diode (207), a second indication after pairing to each other. In one embodiment, the second indication comprises a continuous luminous output. For example, the light emitting diode (207) may turn solid green for a predetermined time.

Figure 10:
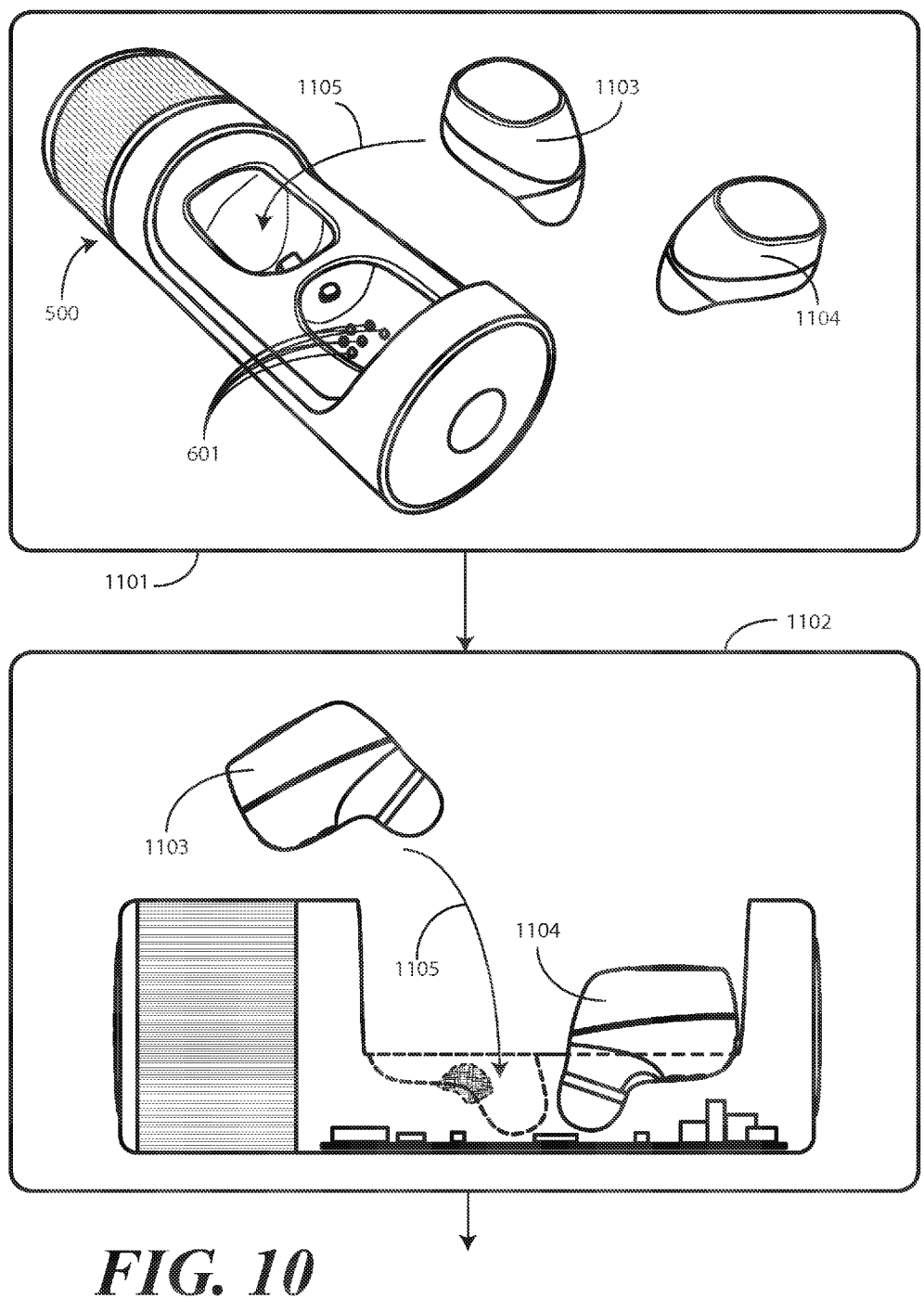
FIG. 10 illustrates one or more method steps in accordance with one or more embodiments of the disclosure.
Figure 11:
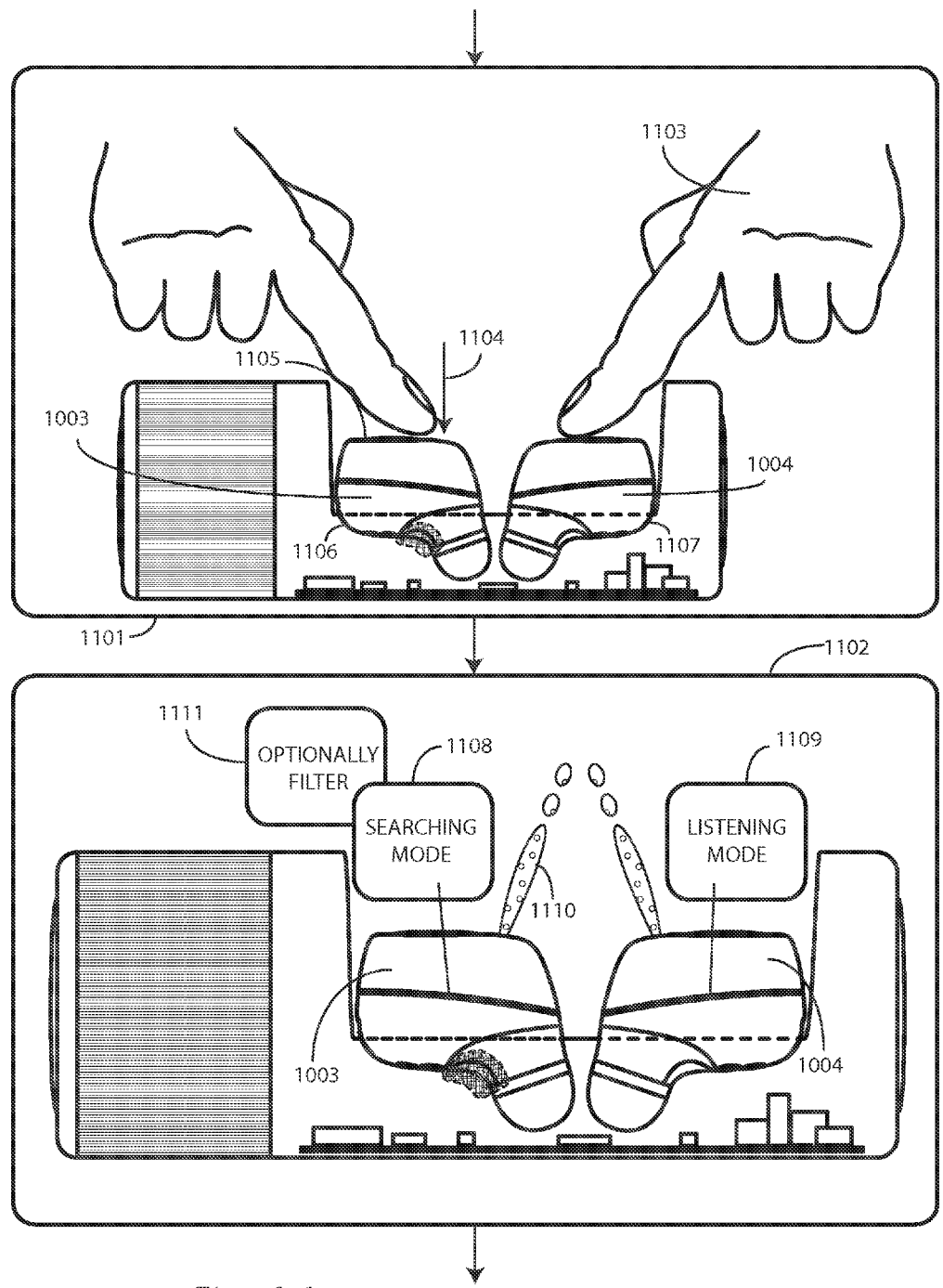
FIG. 11 illustrates one or more method steps in accordance with one or more embodiments of the disclosure.
Figure 12:
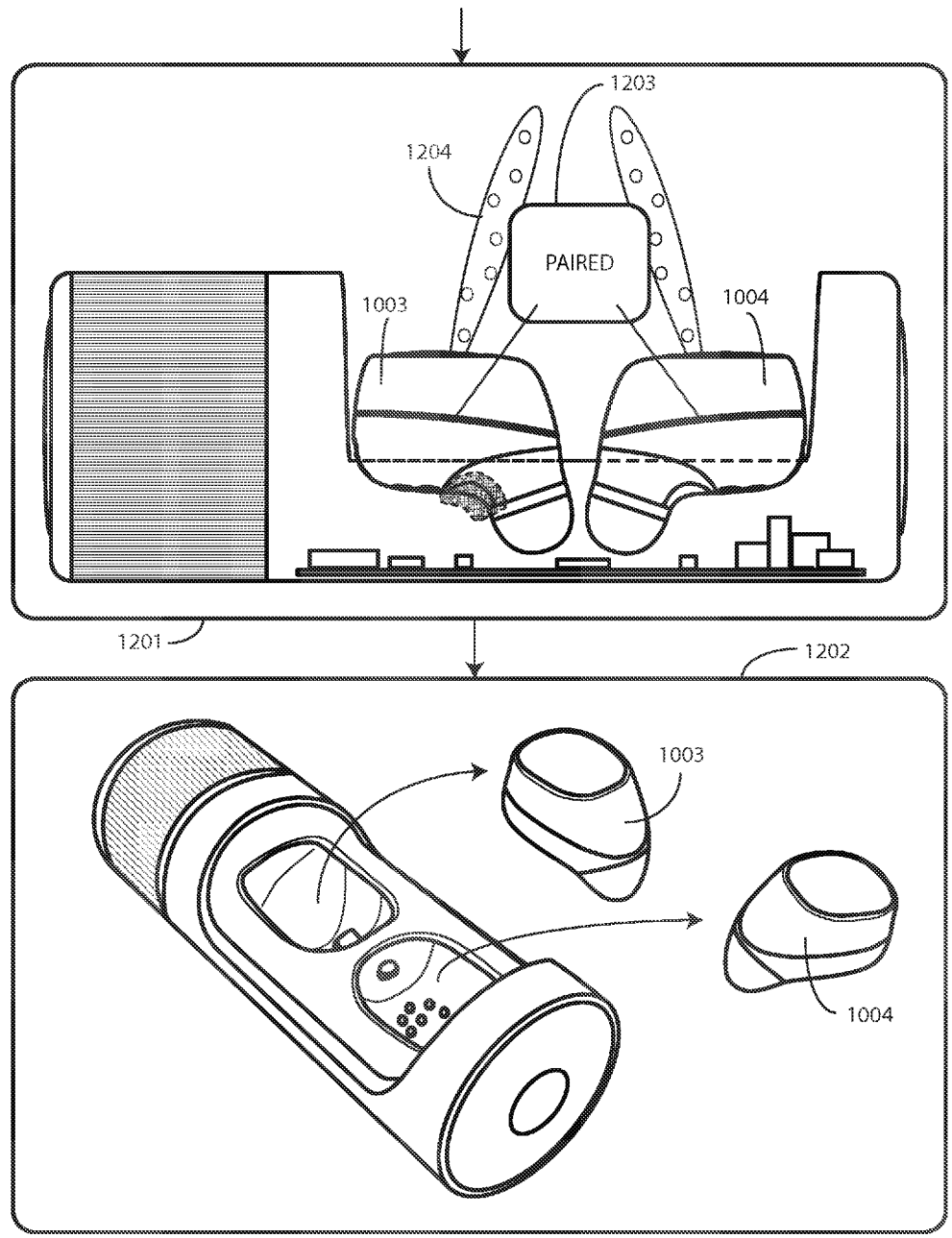
FIG. 12 illustrates one or more method steps in accordance with one or more embodiments of the disclosure.

One example of this method 900 is depicted graphically at FIGS. 10-12. Beginning with FIG. 10, a first wireless ear bud 1003 and a second wireless ear bud 1004 are disposed 1005 into a wireless communication device accessory 500, which in this embodiment is a charger. In one or more embodiments, the a first wireless ear bud 1003 and a second wireless ear bud 1004 can identify, with one or more control circuits, that they are mechanically coupled to, or disposed in, the wireless communication device accessory 500.

For example, when one or more electrical contacts are exposed through complementary apertures of the lower housing to permit charging of a rechargeable battery or, optionally, programming one or more control circuits, the fact that the first wireless ear bud 1003 or the second wireless ear bud 1004 are mechanically coupled to, or disposed in, the wireless communication device accessory 500 can be detected when one or both of voltage or current is detected at the one or more electrical contacts are exposed through complementary apertures of the lower housing from the electrical contacts 601 of the wireless communication device accessory 500. Thus, at step 1002, the second wireless ear bud 1004 would detect that it is mechanically coupled to, or disposed in, the wireless communication device accessory 500. However, the first wireless ear bud 1003 would not detect this until it was inserted 1005 into the wireless communication device accessory 500.

Turning to FIG. 11, at step 1101 a user 1103 actuates 1104 a user interface actuator 1105, which in this case is a push button. One or more control circuits of the first wireless ear bud 1003 or the second wireless ear bud 1004 detect the actuation 1104 of the user interface actuator 1105.

Since the first wireless ear bud 1003 is in a predefined location, i.e., disposed within charger pocket 1106, which includes a reflective surface 603, at step 1102 its one or more control circuits cause its wireless communication circuit to enter a first mode of operation, which in this case is the searching pairing mode of operation 1108. Similarly, since the second wireless ear bud 1004 is not in the predefined location, but is instead disposed within the second charger pocket 1107 that has no reflective surface, its one or more control circuits cause its wireless communication circuit to enter a second mode of operation. In this example, the second mode of operation is the listening pairing mode of operation 1109.

In one embodiment at step 1102, each of the first wireless ear bud 1003 and the second wireless ear bud 1004 present a first indication 1110. In one embodiment, the first indication 1110 occurs before pairing the first wireless ear bud 1003 to the second wireless ear bud 1004. In this illustrative embodiment, the first indication 1110 comprises a blinking luminous output.

At step 1102, the first wireless ear bud 1003 can optionally perform one or more filtering operations 1111 to "weed out" listening devices based on signal strength, device name, and class of device. Once filtering operations 1111 are complete, the first wireless ear bud 1003 can now pair to the listening device that has the strongest signal strength, which implies the listening device is in closest proximity to the first wireless ear bud 1003, has the correct device name, and supports the appropriate class of device. In this example, this is the second wireless ear bud 1004.

Turning to FIG. 12, at step 1201 the pairing process 1203 is complete. In one or more embodiments, the first wireless ear bud 1003 and the second wireless ear bud 1004 can present, with an output device, a second indication 1204 after the pairing process 1203 is complete. In this example, the second indication 1204 comprises a continuous luminous output. The user (1103) thus knows that the pairing process 1203 is finished. At step 1202, the first wireless ear bud 1003 and the second wireless ear bud 1004 can be used as a tandem pair. In one embodiment, the first wireless ear bud 1003 and the second wireless ear bud 1004 are paired together as a left speaker and a right speaker to deliver stereo audio to the ears of the user (1103).

As illustrated and described above, a wireless communication device can include a housing with a user interface actuator, such as a push button, capacitive touch sensor, or other actuator disposed along the housing. One or more control circuits can be operable with the user interface actuator, and a wireless communication circuit can be operable with the one or more control circuits. A location detector, which can be as simple as an optical communication node and/or one or more electrical contacts exposed through complementary apertures of the housing to permit charging of a rechargeable battery. In one or more embodiments, the one or more control circuits can detect, with the user interface actuator, actuation of the user interface actuator for at least a predetermined duration. The one or more control circuits can determine, with the location detector, whether the wireless communication device is disposed at a predefined location, such as within a predefined pocket of a charger. Where the wireless communication device is disposed at the predefined location, the one or more processors can cause the wireless communication device to enter a searching pairing mode of operation. Where the wireless communication device is disposed at a location other than the predefined location, such as in an alternate pocket of the charger, the one or more processors can cause the wireless communication device to enter a listening pairing mode of operation.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a wireless communication device, the method comprising:
    detecting, with one or more control circuits operable with a user interface actuator, actuation of the user interface actuator for at least a predetermined duration;
    determining, with the one or more control circuits, whether the wireless communication device is disposed at a first predefined location or a second predefined location; and
    where the wireless communication device is disposed at the first predefined location, causing, with the one or more control circuits, a wireless communication circuit to enter a first mode of operation; or
    where the wireless communication device is disposed at the second predefined location, causing, with the one or more control circuits, the wireless communication circuit to enter a second mode of operation.

2. The method of claim 1, further comprising identifying, with the one or more control circuits, that the wireless communication device is mechanically coupled to or disposed in a wireless communication device accessory.

3. The method of claim 1, the first mode of operation comprising a searching pairing mode of operation, the second mode of operation comprising a listening pairing mode of operation.

4. The method of claim 3, further comprising presenting, with an output device, a first indication after the causing the wireless communication circuit to enter the searching pairing mode of operation.

5. The method of claim 4, wherein the wireless communication device is disposed at the first predefined location, the method further comprising pairing the wireless communication device to another wireless communication device.

6. The method of claim 5, the presenting the first indication occurring before the pairing the wireless communication device to the another wireless communication device, further comprising also presenting, with the output device, a second indication after the pairing the wireless communication device to the another wireless communication device.

7. The method of claim 6, the first indication comprising a blinking luminous output, the second indication comprising a continuous luminous output.

8. The method of claim 3, further comprising:
    transmitting, with the wireless communication circuit, an identification request;
    receiving, with the wireless communication circuit, a plurality of identification responses; and
    filtering, with the one or more control circuits, the plurality of identification responses.

9. The method of claim 8, the filtering occurring as a function of one or more of signal strength, device name, or class of device.

10. The method of claim 1, the determining comprising receiving, with an optical communication node, reflections of signals emitted by the optical communication node.

11. The method of claim 10, the first predefined location comprising a first pocket of a wireless communication device accessory, the second predefined location comprising a second pocket of the wireless communication device accessory, wherein the reflections are reflected from a reflective surface disposed along the first pocket of the wireless communication device accessory.

12. A wireless communication device, comprising:
    a housing;
    a user interface actuator disposed along the housing;
    one or more control circuits operable with the user interface actuator;
    a wireless communication circuit operable with the one or more control circuits; and
    a location detector operable with the one or more control circuits;
    the one or more control circuits to:
        detect, with the user interface actuator, actuation of the user interface actuator for at least a predetermined duration;
        determine, with the location detector, whether the wireless communication device is disposed at a predefined location; and
        where the wireless communication device is disposed at the predefined location, cause the wireless communication device to enter a searching pairing mode of operation; and
        where the wireless communication device is disposed at a location other than the predefined location, cause the wireless communication device to enter a listening pairing mode of operation.

13. The wireless communication device of claim 12, the user interface actuator comprising a capacitive sensor.

14. The wireless communication device of claim 13, the user interface actuator comprising a single capacitive sensor, the predetermined duration comprising a duration of at least five seconds.

15. The wireless communication device of claim 13, the wireless communication device comprising a wireless earbud device.

16. The wireless communication device of claim 12, further comprising an output device to provide an indication that the wireless communication device has entered a pairing mode of operation.

17. The wireless communication device of claim 16, the output device comprising a light emitting device, the indication comprising a predefined luminous output.

18. The wireless communication device of claim 12, the location detector comprising an optical communication node, the one or more control circuits to determine whether the wireless communication device is disposed at the predefined location by identifying, with the optical communication node, whether signals emitted by the optical communication node are reflected back to the optical communication node.

19. A method in a wireless communication device, the method comprising:
- identifying, with one or more control circuits, that the wireless communication device is mechanically coupled to or disposed in a wireless communication device accessory;
- determining, with the one or more control circuits, whether the wireless communication device is disposed at a first predefined location in the wireless communication device accessory or a second predefined location in the wireless communication device accessory; and
- where the wireless communication device is disposed at the first predefined location, causing, with the one or more control circuits, a wireless communication circuit to enter a first mode of operation; or
- where the wireless communication device is disposed at the second predefined location, causing, with the one or more control circuits, the wireless communication circuit to enter a second mode of operation.

20. The method of claim 19, wherein the wireless communication device is disposed at the first predefined location, the method further comprising pairing the wireless communication device to another wireless communication device disposed at the second predefined location.

* * * * *